US012584081B2

(12) United States Patent
Handa et al.

(10) Patent No.: US 12,584,081 B2
(45) Date of Patent: Mar. 24, 2026

(54) CLEANING COMPOSITION FOR ORAL APPLIANCE

(71) Applicant: KAO CORPORATION, Tokyo (JP)

(72) Inventors: Takuya Handa, Nagareyama (JP); Tomoya Satou, Koto-ku (JP)

(73) Assignee: KAO CORPORATION, Tokyo (JP)

( * ) Notice: Subject to any disclaimer, the term of this patent is extended or adjusted under 35 U.S.C. 154(b) by 564 days.

(21) Appl. No.: 17/996,148

(22) PCT Filed: Jan. 26, 2021

(86) PCT No.: PCT/JP2021/002625
§ 371 (c)(1),
(2) Date: Oct. 13, 2022

(87) PCT Pub. No.: WO2021/210234
PCT Pub. Date: Oct. 21, 2021

(65) Prior Publication Data

US 2023/0212481 A1 Jul. 6, 2023

(30) Foreign Application Priority Data

Apr. 14, 2020 (JP) ................................ 2020-072169
Aug. 24, 2020 (JP) ................................ 2020-141048

(51) Int. Cl.
*C11D 3/37* (2006.01)
*C11D 3/20* (2006.01)

(52) U.S. Cl.
CPC .......... *C11D 3/3757* (2013.01); *C11D 3/2006* (2013.01); *C11D 3/2041* (2013.01)

(58) Field of Classification Search
CPC .... C11D 3/3757; C11D 3/2006; C11D 3/2041
See application file for complete search history.

(56) References Cited

U.S. PATENT DOCUMENTS 4,115,293 A * 9/1978 Schoenholz ......... C11D 3/3942 510/117
4,181,621 A 1/1980 Raaf et al.
4,807,649 A 2/1989 Eoga
5,486,304 A * 1/1996 Eoga ................. C11D 3/38609 510/106
2011/0059882 A1 3/2011 Smith et al.
2012/0164236 A1 6/2012 Iwasa et al.

FOREIGN PATENT DOCUMENTS

JP 09-175968 A 7/1997
JP 2000-247851 A 9/2000
JP 2010-275398 A 12/2010
JP 2010280588 A * 12/2010
JP 2011-195496 A 10/2011
JP 2012-51858 A 3/2012
JP 2022-7954 A 1/2022
JP 2022-36706 A 3/2022
JP 2022-36903 A 3/2022
JP 2022-45179 A 3/2022
JP 2022-59973 A 4/2022
JP 2022-169428 A 11/2022

OTHER PUBLICATIONS

Tsuji, Coating-Type Liquid Denture Cleanser Composition, 2010, Tranlsated (Year: 2010).*
International Search Report mailed on Mar. 30, 2021 in PCT/JP2021/002625 filed on Jan. 26, 2021 (2 pages).
Extended European Search Report issued on Jun. 18, 2024 in corresponding European Patent Application No. 21787652.3, 8 pages.

* cited by examiner

*Primary Examiner* — Angela C Brown-Pettigrew
(74) *Attorney, Agent, or Firm* — Oblon, McClelland, Maier & Neustadt, L.L.P.

(57) ABSTRACT

A cleaning composition for an oral appliance, including (A) and (B). (A) 0.05 mass % or more and 8 mass % or less of an anionic homopolymer or copolymer which has a mass average molecular weight of 2,000 or higher and 500,000 or lower and includes a constituent unit derived from (a1) an anionic monomer having a carboxyl group, a sulfo group, or a phosphoric acid group. (B) one or more surfactants selected from the group consisting of an anionic surfactant, a nonionic surfactant, and an amphoteric surfactant.

10 Claims, No Drawings

CLEANING COMPOSITION FOR ORAL APPLIANCE

CROSS REFERENCE TO RELATED APPLICATIONS

This application is a National Stage entry under 35 U.S.C. § 371 of PCT/JP2021/002625, filed on Jan. 26, 2021, and claims priority to Japanese Patent Application Nos. 2020-072169 and 2020-141048, filed on Apr. 14, 2020 and Aug. 24, 2020, respectively. The entire contents of each are incorporated herein by reference.

FIELD OF THE INVENTION

The present invention relates to a cleaning composition for an oral appliance.

BACKGROUND OF THE INVENTION

As the population has super-aged in recent years, the number of people obliged to wear a removable oral appliance such as dentures is increasing at an accelerated rate. In such a removable oral appliance, for example, dentures or dental corrective devices, dirt such as a denture plaque or food residues attached during wearing the oral appliance tends to easily remain. If a person wears an oral appliance with the remaining denture plaque or the like, bad breaths, dental caries, gum diseases, or the like may be caused.

Thus, oral appliances need to be kept clean and inevitably require daily elaborate care, also for maintaining physical health.

Under these circumstances, various compositions have been developed in order to contribute to the accomplishment of care of oral appliances. For example, Patent Literature 1 discloses an anti-stain coating agent comprising an anionic polymer compound and/or a salt thereof which has a specific value of a carboxyl group content ratio. Patent Literature 2 discloses a coating-type liquid denture cleanser composition in which a nonionic surfactant, a cationic fungicide, sulfite and a water soluble polymer material are blended at specific amounts and specific mass ratios, and which has a specific range of pH values. This composition enhances a stain dirt removal effect on dentures or the antiseptic force of a dipping solution upon denture dipping.

PATENT LITERATURES (Patent Literature 1) JP-A-2000-247851
(Patent Literature 2) JP-A-2010-280588

SUMMARY OF THE INVENTION

The present invention provides a cleaning composition for an oral appliance, comprising the following components (A) and (B):

(A) 0.05 mass % or more and 8 mass % or less of an anionic homopolymer or copolymer which has a mass average molecular weight of 2,000 or higher and 500,000 or lower and comprises a constituent unit derived from (a1) an anionic monomer having a carboxyl group, a sulfo group, or a phosphoric acid group; and (B) one or more surfactants selected from the group consisting of an anionic surfactant, a nonionic surfactant, and an amphoteric surfactant, wherein the mass ratio of the content of the component (A) to the content of the component (B), ((A)/(B)), is 0.05 or more and 50 or less, and the content of (C) a monohydric or dihydric alcohol having 2 or more and 6 or less carbon atoms is less than 8 mass %.

The anti-stain coating agent described in Patent Literature 1 is a mere technique of preventing stain accumulation and suppressing staining by applying the agent to dentures or the like in advance. This technique is not aimed at removing a denture plaque already attached firmly to an oral appliance such as dentures. The composition described in Patent Literature 2 also requires application over a long time using a dipping solution or a dissolving solution, or physical additive force such as brushing. In this situation, the composition is still susceptible to improvement in order to achieve better cleaning of an intraorally oral appliance.

Specifically, the present invention relates to a cleaning composition for an oral appliance which has high cleaning performance and can exert an excellent denture plaque removal effect.

Accordingly, the present inventors conducted diligent studies to solve these problems and consequently found a cleaning composition for an oral appliance, comprising a specific anionic homopolymer or copolymer and a specific surfactant, and having a limited content of a specific alcohol, whereby the cleaning composition can remove a denture plaque firmly attached to an oral appliance such as dentures.

The cleaning composition for an oral appliance of the present invention can exert an excellent denture plaque removal effect by application for a short time. Hence, the cleaning composition for an oral appliance of the present invention is capable of effectively removing the denture plaque of an oral appliance even if the application time to the intraorally mounted appliance is shortened, and enables high cleaning performance to be realized.

Thus, the cleaning composition for an oral appliance of the present invention, which exerts an excellent effect by application for a short time, facilitates increasingly frequent application and can permit continuous use of clean oral appliances while reducing burdens required for the care of oral appliances by users.

Furthermore, the cleaning composition for an oral appliance of the present invention eliminates excessive need of application over a long time using a dipping solution or a dissolving solution, or physical additive force such as brushing, enables high cleaning performance to be realized, and facilitates repeated use a plurality times per day.

DETAILED DESCRIPTION OF THE INVENTION

Hereinafter, the present invention will be described in detail.

In the present specification, the “oral appliance” means a so-called dental appliance which needs to be attached and removed in the oral cavity, such as complete dentures, partial dentures, an orthodontic appliance, or a retainer (hereinafter, these are also collectively referred to as “dentures or the like”), or a mouthpiece or a mouthguard. Specifically, for example, the complete dentures (complete false teeth) are dentures to be mounted in the edentulous jaw and are constituted by artificial teeth and a denture base. On the other hand, the partial dentures (partial false teeth) are dentures to be mounted in the jaw partially lacking teeth and are constituted by artificial teeth, a denture base, and an anchor device such as a clasp, a rest, or an attachment. The orthodontic appliance, the retainer, or the mouthpiece has a constitution similar thereto. Examples of the material of the denture base generally include resins such as acrylic resin. Examples of the material of the artificial teeth or the anchor device include such resins as well as metals such as titanium, and ceramic. Examples of the material of the mouthpiece or the mouthguard generally include resins such as ethylene vinyl acetate.

In the present specification, the "denture plaque" means an aggregate of bacteria attached to an oral appliance, and extracellular substances produced by the bacteria.

The cleaning composition for an oral appliance of the present invention contains, as a component (A), an anionic homopolymer or copolymer which has a mass average molecular weight of 2,000 or higher and 500,000 or lower and comprises a constituent unit derived from an anionic monomer (a1) having a carboxyl group, a sulfo group, or a phosphoric acid group. This specific anionic homopolymer or copolymer (A) is strongly adsorbed, in cooperation with a component (B) mentioned later, onto the surface of a denture plaque firmly attached to an oral appliance removed from the oral cavity. Thus, the component (A) can destroy the aggregation structure of the denture plaque and effectively eradicate the denture plaque from the oral appliance. Therefore, the component (A) is considered to exert an excellent denture plaque removal effect and enhance cleaning performance.

The mass average molecular weight of the component (A) is 2,000 or higher, preferably 3,000 or higher, more preferably 6,000 or higher, further more preferably 10,000 or higher, from the viewpoint of validly exerting a denture plaque removal effect. The mass average molecular weight of the component (A) is 500,000 or lower, preferably 350,000 or lower, more preferably 200,000 or lower, further more preferably 100,000 or lower, even more preferably 50,000 or lower, from the viewpoint of securing favorable solubility or dispersibility of each component and validly exerting a denture plaque removal effect. The mass average molecular weight of the component (A) is 2,000 or higher and 500,000 or lower, preferably from 3,000 to 350,000, more preferably from 6,000 to 200,000, further more preferably from 10,000 to 100,000, even more preferably from 10,000 to 50,000.

The mass average molecular weight (Mw) means a value determined by gel permeation chromatography (which uses a chloroform solvent, a calibration curve defined with linear polystyrene as a standard, and a refractive index detector) measurement.

The component (A) is an anionic homopolymer or copolymer comprising a constituent unit derived from (a1) an anionic monomer having a carboxyl group, a sulfo group, or a phosphoric acid group. Specific examples of the monomer (a1) constituting the component (A) include one or more selected from the group consisting of acrylic acid, methacrylic acid, itaconic acid, maleic acid, fumaric acid, sulfonic acid, styrenesulfonic acid, methacryloyloxyalkylsulfonic acid, methacrylamidoalkylsulfonic acid, acryloyloxyalkyl phosphate, and their anhydrides, their monomers partially substituted by an alkyl group or the like, and monomers derived from sugars such as glucopyranose in which carboxymethyl groups are bonded to some hydroxy groups. Among them, a monomer containing no aromatic or alicyclic ring in the molecular structure is preferred. One or more selected from the group consisting of acrylic acid, methacrylic acid, maleic acid, and sulfonic acid is more preferred.

The component (A) may be a homopolymer composed of a constituent unit derived from only one of these monomers (a1), may be a copolymer composed of constituent units derived from two or more monomers (a1), or may be a copolymer composed of a constituent unit(s) derived from the monomer(s) (a1) and a constituent unit(s) derived from an additional monomer(s) other than the monomer (a1).

The content of the constituent unit derived from the monomer (a1) in 100 mass % in total of constituent units of the component (A) is preferably 15 mass % or more, more preferably 35 mass % or more, further more preferably 50 mass % or more, and preferably 100 mass % or less, from the viewpoint of validly securing the exertion of an excellent denture plaque removal effect.

Specific examples of the component (A) include one or more selected from the group consisting of an acrylic acid homopolymer, a methacrylic acid homopolymer, an acrylic acid/maleic acid copolymer, an acrylic acid/methacrylic acid copolymer, an acrylic acid/sulfonic acid copolymer, a vinyl acetate/maleic acid copolymer, a phosphinic acid/acrylic acid copolymer, and carboxymethylcellulose. Among them, one or more selected from the group consisting of an acrylic acid homopolymer, an acrylic acid/maleic acid copolymer, an acrylic acid/methacrylic acid copolymer, and an acrylic acid/sulfonic acid copolymer is preferred, one or more selected from the group consisting of an acrylic acid/maleic acid copolymer and an acrylic acid/sulfonic acid copolymer is more preferred, and an acrylic acid/maleic acid copolymer is further preferred, from the viewpoint of exerting an excellent denture plaque removal effect while validly exerting even a denture plaque formation suppressing effect.

The mass ratio of a constituent unit derived from an acrylic acid monomer to a constituent unit derived from a maleic acid monomer constituting the acrylic acid/maleic acid copolymer (acrylic acid/maleic acid) is preferably from 0.01 to 99, more preferably from 0.05 to 50, further more preferably from 0.1 to 10.

The content of the component (A) is 0.05 mass % or more, preferably 0.07 mass % or more, more preferably 0.1 mass % or more, further more preferably 0.2 mass % or more, even more preferably 0.3 mass % or more, in the cleaning composition for an oral appliance of the present invention from the viewpoint of exerting an excellent denture plaque removal effect. The content of the component (A) is 8 mass % or less, preferably 7 mass % or less, more preferably 6 mass % or less, further more preferably 5 mass % or less, even more preferably 4 mass % or less, in the cleaning composition for an oral appliance of the present invention from the viewpoint of securing favorable solubility or dispersibility of each component. The content of the component (A) is 0.05 mass % or more and 8 mass % or less, preferably from 0.07 to 7 mass %, more preferably from 0.1 to 6 mass %, further more preferably from 0.2 to 5 mass %, even more preferably from 0.3 to 4 mass %, in the cleaning composition for an oral appliance of the present invention.

The cleaning composition for an oral appliance of the present invention contains, as a component (B), one or more surfactants selected from the group consisting of an anionic surfactant (b1), a nonionic surfactant (b2), and an amphoteric surfactant (b3). This can secure favorable solubility or dispersibility of each component including the component (A), exert an excellent denture plaque removal effect, and enhance cleaning performance.

Examples of the anionic surfactant (b1) include one or more selected from the group consisting of; fatty acid salt such as oleate and laurate; alkyl sulfuric acid ester salt such as lauryl sulfate, myristyl sulfate, palmityl sulfate, stearyl sulfate, octyl sulfate, and capryl sulfate; alkylsulfonate such as alkylbenzenesulfonate, α-olefinsulfonate, and hydroxyalkanesulfonate; acyl amino acid salt such as acylglutamate and acyl sarcosinate; N-methyl long-chain acyl taurate such as lauroyl methyl taurate; alkyl phosphate such as alkyl phosphate; higher fatty acid sulfonated monoglyceride salt and fatty acid ester salt of isethionic acid; and polyoxyethylene monoalkyl phosphate. Among them, one or more selected from the group consisting of fatty acid salt, alkyl sulfuric acid ester salt, and acyl amino acid salt is preferred from the viewpoint of enhancing an excellent denture plaque removal effect.

The anionic surfactant (b1) preferably has a mass average molecular weight of less than 2,000.

The fatty acid salt is preferably fatty acid salt having an alkyl group or an alkenyl group having 12 to 20 carbon atoms, more preferably fatty acid salt having an alkenyl group having 16 to 18 carbon atoms, from the viewpoint of enhancing an excellent denture plaque removal effect.

Examples of the nonionic surfactant (b2) include one or more selected from the group consisting of: polyoxyethylene hydrogenated castor oil; sucrose fatty acid ester; sorbitan fatty acid ester; glycerin fatty acid ester such as glyceride monostearate; alkyl glucoside; polyglycerin fatty acid ester such as decaglyceride monostearate and decaglyceride monomyristate; polyoxyethylene monoalkyl (or alkenyl) ether, a polyoxyethylene-polyoxypropylene copolymer, and polyoxyethylene alkyl phenyl ether such as polyoxyethylene nonyl phenyl ether; fatty acid alkanolamide such as coconut fatty acid diethanolamide; and polyethylene glycol fatty acid ester. Among them, polyoxyethylene monoalkyl (or alkenyl) ether or a polyoxyethylene-polyoxypropylene copolymer is preferred, and polyoxyethylene monoalkyl (or alkenyl) ether is more preferred, from the viewpoint of exerting a highly fast-acting, excellent denture plaque removal effect.

Examples of the amphoteric surfactant (b3) include one or more selected from the group consisting of: betaine acetate such as lauryl dimethylaminoacetate betaine; imidazolinium betaine such as 2-alkyl-N-carboxymethyl-N-hydroxyethyl-N-imidazolium betaine; alkyl sulfobetaine such as lauryl sulfobetaine and lauryl hydroxy sulfobetaine; cocamidoalkyl betaine such as cocamidopropyl betaine; long-chain alkyl imidazoline betaine such as sodium N-alkyl-1-hydroxyethyl imidazoline betaine; and alkylamine oxide. Among them, one or more selected from the group consisting of lauryl hydroxy sulfobetaine, cocamidoalkyl betaine, alkyl sulfobetaine, and alkylamine oxide is preferred, and one or more selected from the group consisting of cocamidoalkyl betaine and alkylamine oxide is more preferred, from the viewpoint of securing pleasant use impression.

The content of the component (B) (the total content of the component (b1), the component (b2) and the component (b3)) is preferably 0.1 mass % or more, more preferably 0.3 mass % or more, further more preferably 0.7 mass % or more, even more preferably 1 mass % or more, in the cleaning composition for an oral appliance of the present invention from the viewpoint of exerting an excellent denture plaque removal effect. The content of the component (B) is preferably 20 mass % or less, more preferably 15 mass % or less, further more preferably 10 mass % or less, even more preferably 8 mass % or less, in the cleaning composition for an oral appliance of the present invention from the viewpoint of securing pleasant use impression in wearing an oral appliance after application of the cleaning composition for an oral appliance of the present invention. The content of the component (B) is preferably from 0.1 to 20 mass %, more preferably from 0.3 to 15 mass %, more preferably from 0.7 to 10 mass %, further more preferably from 1 to 8 mass %.

The mass ratio of the content of the component (A) to the content of the component (B), ((A)/(B)), is 0.05 or more, preferably 0.1 or more, more preferably 0.15 or more, further more preferably 0.25 or more, even more preferably 0.3 or more, and 50 or less, preferably 35 or less, more preferably 20 or less, further more preferably 15 or less, even more preferably 8 or less, from the viewpoint of exerting an excellent denture plaque removal effect. The mass ratio of the content of the component (A) to the content of the component (B), ((A)/(B)), is 0.05 or more and 50 or less, preferably from 0.1 to 35, more preferably from 0.15 to 20, further more preferably from 0.25 to 15, even more preferably from 0.3 to 8.

The content of a monohydric or dihydric alcohol (C) having 2 or more and 6 or less carbon atoms in the cleaning composition for an oral appliance of the present invention is less than 8 mass %, or the cleaning composition for an oral appliance of the present invention contains no monohydric or dihydric alcohol (C) having 2 or more and 6 or less carbon atoms. By such limitations on the component (C) contained, the cleaning composition for an oral appliance of the present invention validly exerts an excellent denture plaque removal effect, while pleasant use impression can be secured in wearing an oral appliance after application of the cleaning composition for an oral appliance of the present invention.

Specific examples of the component (C) include ethanol, propanol, butanol, isopropanol, propylene glycol, butylene glycol, dipropylene glycol and ethylene glycol.

The content of the component (C) is less than 8 mass %, preferably less than 7 mass %, more preferably less than 5 mass %, even more preferably less than 4 mass %, even more preferably less than 2 mass %, even more preferably less than 1 mass %, even more preferably less than 0.5 mass %, in the cleaning composition for an oral appliance of the present invention, or the cleaning agent composition for an oral mounted appliance of the present invention preferably contains no component (C), from the viewpoint of securing pleasant use impression while achieving an excellent denture plaque removal effect.

The cleaning composition for an oral appliance of the present invention can further contain a pH adjuster (D). This can maintain pH effective for enhancing the fast-acting properties of a denture plaque removal effect.

Specific examples of the component (D) include one or more selected from the group consisting of: carbonate and bicarbonate; potassium hydroxide and sodium hydroxide; organic acids such as citric acid, malic acid, lactic acid, tartaric acid, and succinic acid, and their salts. Among them, one or more selected from the group consisting of carbonate and bicarbonate is preferred, and one or more selected from the group consisting of sodium carbonate, sodium bicarbonate and sodium sesquicarbonate is more preferred.

In this case, the content of the pH adjuster is preferably from 0.1 to 60 mass %, more preferably from 0.15 to 20 mass %, further more preferably from 0.2 to 10 mass %, even more preferably from 0.6 to 5 mass %, even more preferably from 0.6 to 1.4 mass %, even more preferably from 0.6 to 1 mass %, even more preferably from 0.6 to 0.8 mass %, in the cleaning composition for an oral appliance of the present invention from the viewpoint of stabilizing the pH of the cleaning composition for an oral appliance of the present invention.

The cleaning composition for an oral appliance of the present invention preferably contains water. This can promote the onset of the interaction between the components (A) and (B) against a denture plaque, enhance the diffusivity of the cleaning composition for an oral appliance after its application to an oral appliance, and bring about an excellent denture plaque removal effect, while favorably dispersing or dissolving each of the components described above.

The content of water is preferably 10 mass % or more, more preferably 30 mass % or more, further more preferably 50 mass % or more, further more preferably 70 mass % or more, further more preferably 90 mass % or more, and preferably 99.9 mass % or less, more preferably 99.5 mass % or less, further more preferably 99 mass % or less, in the cleaning composition for an oral appliance of the present invention.

The water according to the present invention means the whole moisture contained in the cleaning composition for an oral appliance, including not only purified water or the like directly blended into the cleaning composition for an oral appliance, but moisture contained in each component blended.

As for a method for measuring the content of water, the content of water may be determined by calculation from the amount of moisture blended and the amount of moisture in blended components, or may be measured in, for example, a Karl-Fischer moisture meter.

The cleaning composition for an intraorally mounted appliance of the present invention can contain, for example, an anti-inflammatory agent, an antiseptic, a fragrance, a pigment, or a dye, in addition to the components described above, without inhibiting the advantageous effects of the present invention.

The pH at 25° C. of the cleaning composition for an oral appliance of the present invention is preferably 7 or higher, more preferably 8.8 or higher, further more preferably 9 or higher, even more preferably 9.5 or higher, and preferably 14 or lower, more preferably 13 or lower, further more preferably 12 or lower, even more preferably 11 or lower, from the viewpoint of validly enhancing the fast-acting properties of a denture plaque removal effect.

The form of the cleaning composition for an oral appliance of the present invention may be a liquid, foam, paste, gel, powder, granule, or tablet form, and may be the form of a sheet impregnated with the cleaning composition for an oral appliance of the present invention in a liquid state, the form of a spray container filled with the cleaning composition for an oral appliance of the present invention, the form of a foam discharge container filled therewith, or the form of an aerosol container filled therewith.

For cleaning an oral appliance using the cleaning composition for an oral appliance of the present invention, the powder, granule, or tablet form can be diluted with water or the like or dissolved in water or the like, and used as a cleaning agent for an oral appliance. In this case, the cleaning composition for an oral appliance can have a formulation which satisfies the predetermined requirements at the time of application of the cleaning agent for an oral appliance.

Among them, the cleaning composition for an oral appliance of the present invention is preferably in the form of a foam, and can effectively exert an excellent denture plaque removal effect and formation suppressing effect by covering an oral appliance with the foam.

In particular, the form of a foam allows the cleaning composition to sufficiently reach every corner of an oral appliance having a complicated shape by covering the oral appliance with the foam, and can validly and effectively exert an excellent denture plaque removal effect and formation suppressing effect. As a result, a highly fast-acting, excellent denture plaque removal effect and formation suppressing effect can be exerted, without particular physical additive force such as brushing, by merely rinsing the oral appliance after application of the composition to wash off the composition.

A method for cleaning an oral appliance using the cleaning composition for an oral appliance of the present invention specifically involves first dipping the oral appliance such as dentures after use in the cleaning composition for an oral appliance or applying the cleaning composition for an oral appliance to the oral appliance by foam discharge, application, dropwise addition or spraying, or the like, and then leaving them for a given time. The leaving time can usually be from 3 to 30 minutes and is preferably from 4 to 20 minutes, more preferably from 5 to 10 minutes.

Subsequently, the oral appliance thus left is rinsed with water or the like to wash off the cleaning composition for an oral appliance. The cleaning agent composition for an oral appliance of the present invention can be more preferably washed off and eliminates the need of particular physical additive force such as brushing.

When the cleaning composition for an oral appliance of the present invention is in the form of a foam, the usage pattern thereof involves covering an oral appliance such as dentures with the cleaning composition for an oral appliance in a foam, and then leaving them for a given time.

The time for which the intraorally mounted appliance is covered with the foam is preferably 1 minute or longer, more preferably 2 minutes or longer, further more preferably 3 minutes or longer, from the viewpoint of sufficiently enjoying an excellent denture plaque removal effect and formation suppressing effect. The time for which the intraorally mounted appliance is covered with the foam is preferably 30 minutes or shorter, more preferably 20 minutes or shorter, further more preferably 10 minutes or shorter, from the viewpoint of sufficiently exerting the effect of the foam. The time for which the intraorally mounted appliance is covered with the foam is preferably 1 minute or longer and 30 minutes or shorter, more preferably from 2 to 20 minutes, further more preferably from 3 to 10 minutes.

The volume of the foam used to cover the oral appliance is preferably 0.05 g or more, more preferably 0.07 g or more, further more preferably 0.1 g or more, and preferably 3.5 g or less, more preferably 3.2 g or less, further more preferably 3 g or less, per $cm^2$ of the surface area of the oral appliance from the viewpoint of sufficiently exerting the effect of the foam and sufficiently enjoying an excellent denture plaque removal effect and formation suppressing effect.

After the oral appliance is covered with the formed foam, the cleaning composition is preferably washed off by rinsing the oral appliance with water. Thus, the cleaning composition for an oral appliance of the present invention in the form of a foam can exert a highly fast-acting, excellent denture plaque removal effect and formation suppressing effect while the covering foam is washed off by merely rinsing the oral appliance with water without the need of particular physical additive force. Therefore, this composition can also reduce burdens on users such as elderly people and facilitate increasingly frequent use.

After the oral appliance is covered with the formed foam, the cleaning composition is preferably washed off by rinsing the oral appliance after application of the composition with water, without physical additive force. This enables the oral appliance to be cleaned simply and effectively.

The cleaning composition for an oral appliance of the present invention is preferably filled into a container equipped with a foam formation mechanism, and a foam is formed by injection or discharge from the container, from the viewpoint of sufficiently exerting the effect of the foam.

The container equipped with a foam formation mechanism is a container which can form a foam by injecting or discharging contents filled in the container to the outside of the container from an injection port or a discharge port via the foam formation mechanism. Examples of such a container equipped with a foam formation mechanism include trigger type injection containers and pump type dispenser containers.

The trigger type injection container has a container main body to be filled with contents, and a trigger and a sprayer which serve as the foam formation mechanism. The contents are injected from the injection port of the sprayer to the outside by pulling the trigger upon application so that a foam is formed. Such a trigger type injection container may be a direct pressure system or may be an accumulator system.

The pump type dispenser container has a container main body to be filled with contents, and a foam formation mechanism such as a tube, a nozzle, and a mesh inside thereof. The contents are discharged from the discharge port of the tube or the nozzle to the outside by partially pressing the container upon application so that a foam is formed.

In the case of cleaning an oral appliance using the cleaning composition for an oral appliance of the present invention, a trigger type injection container is preferably used among these containers from the viewpoint of sufficiently exerting the effect of the foam.

In the case of using a trigger type injection container, it is desirable to set an injection diameter in an injection distance of 20 cm to preferably 2 cm or longer, more preferably 3 cm or longer, and preferably 10 cm or shorter, more preferably 8 cm or shorter, from the viewpoint of sufficiently exerting the effect of the foam.

For the trigger type injection container, it is desirable to set an injection force of the cleaning composition as the contents in an injection distance of 20 cm to preferably 1 g·f or more, more preferably 3 g·f or more, and preferably 10 g·f or less, more preferably 8 gf or less, from the viewpoint of validly forming a foam.

Thus, the cleaning composition for an oral appliance of the present invention can sufficiently remove the denture plaque of an oral appliance by application for a short time without the need of particular physical additive force, and can also reduce burdens on users such as elderly people and facilitate increasingly frequent use.

In relation to the embodiments mentioned above, the present invention further discloses the following cleaning composition for an oral appliance, and a method for cleaning an oral appliance using the same.

[1] A cleaning composition for an oral appliance, comprising the following components (A) and (B):

(A) 0.05 mass % or more and 8 mass % or less of an anionic homopolymer or copolymer which has a mass average molecular weight of 2,000 or higher and 500,000 or lower and comprises a constituent unit derived from (a1) an anionic monomer having a carboxyl group, a sulfo group, or a phosphoric acid group; and (B) one or more surfactants selected from the group consisting of an anionic surfactant, a nonionic surfactant, and an amphoteric surfactant, wherein the mass ratio of the content of the component (A) to the content of the component (B), ((A)/(B)), is 0.05 or more and 50 or less, and the content of (C) a monohydric or dihydric alcohol having 2 or more and 6 or less carbon atoms is less than 8 mass %.

[2] The cleaning composition for an oral appliance according to [1], wherein the anionic monomer (a1) constituting the component (A) is one or more selected from the group consisting of acrylic acid, methacrylic acid, itaconic acid, maleic acid, fumaric acid, sulfonic acid, styrenesulfonic acid, methacryloyloxyalkylsulfonic acid, methacrylamidoalkylsulfonic acid, acryloyloxyalkyl phosphate, and their anhydrides, their monomers partially substituted by an alkyl group or the like, and monomers derived from sugars such as glucopyranose in which carboxymethyl groups are bonded to some hydroxy groups, preferably one or more selected from the group consisting of acrylic acid, methacrylic acid, maleic acid, and sulfonic acid.

[3] The cleaning composition for an oral appliance according to [1] or [2], wherein the content of the constituent unit derived from the anionic monomer (a1) in 100 mass % in total of constituent units of the component (A) is preferably 15 mass % or more, more preferably 35 mass % or more, further more preferably 50 mass % or more, and preferably 100 mass % or less.

[4] The cleaning composition for an oral appliance according to any one of [1] to [3], wherein the component (A) is one or more selected from the group consisting of an acrylic acid homopolymer, a methacrylic acid homopolymer, an acrylic acid/maleic acid copolymer, an acrylic acid/methacrylic acid copolymer, an acrylic acid/sulfonic acid copolymer, a vinyl acetate/maleic acid copolymer, a phosphinic acid/acrylic acid copolymer, and carboxymethylcellulose, preferably one or more selected from the group consisting of an acrylic acid homopolymer, an acrylic acid/maleic acid copolymer, an acrylic acid/methacrylic acid copolymer, and an acrylic acid/sulfonic acid copolymer, more preferably one or more selected from the group consisting of an acrylic acid/maleic acid copolymer and an acrylic acid/sulfonic acid copolymer, further more preferably an acrylic acid/maleic acid copolymer.

[5] The cleaning composition for an oral appliance according to any one of [1] to [4], wherein the content of the component (A) is preferably 0.07 mass % or more, more preferably 0.1 mass % or more, further more preferably 0.2 mass % or more, even more preferably 0.3 mass % or more, and preferably 7 mass % or less, more preferably 6 mass % or less, further more preferably 5 mass % or less, even more preferably 4 mass % or less.

[6] The cleaning composition for an oral appliance according to any one of [1] to [5], wherein the anionic surfactant (b1) preferably has a mass average molecular weight of less than 2,000.

[7] The cleaning composition for an oral appliance according to any one of [1] to [6], wherein the nonionic surfactant (b2) is preferably polyoxyethylene monoalkyl (or alkenyl) ether or a polyoxyethylene-polyoxypropylene copolymer, more preferably polyoxyethylene monoalkyl (or alkenyl) ether.

[8] The cleaning composition for an oral appliance according to any one of [1] to [7], wherein the amphoteric surfactant (b3) is preferably one or more selected from the group consisting of lauryl hydroxy sulfobetaine, cocamidoalkyl betaine, alkyl sulfobetaine, and alkylamine oxide, more preferably one or more selected from the group consisting of cocamidoalkyl betaine and alkylamine oxide.

[9] The cleaning composition for an oral appliance according to any one of [1] to [8], wherein the content of the component (B) (the total content of the component (b1), the component (b2) and the component (b3)) is preferably 0.1 mass % or more, more preferably 0.3 mass % or more, further more preferably 0.7 mass % or more, even more preferably 1 mass % or more, and preferably 20 mass % or less, more preferably 15 mass % or less, further more preferably 10 mass % or less, even more preferably 8 mass % or less.

The cleaning composition for an oral appliance according to any one of [1] to [9], wherein the mass ratio of the content of the component (A) to the content of the component (B), ((A)/(B)), is preferably 0.1 or more, more preferably 0.15 or more, further more preferably 0.25 or more, even more preferably 0.3 or more, and preferably 35 or less, more preferably 20 or less, further more preferably 15 or less, even more preferably 8 or less.

[11] The cleaning composition for an oral appliance according to any one of [1] to [10], wherein the content of the component (C) is preferably less than 7 mass %, more preferably less than 5 mass %, even more preferably less than 4 mass %, even more preferably less than 2 mass %, even more preferably less than 1 mass %, even more preferably less than 0.5 mass %, or the cleaning composition for an oral appliance of the present invention contains no component (C).

[12] The cleaning composition for an oral appliance according to any one of [1] to [11], wherein the content of a pH adjuster (D) is preferably from 0.1 to 60 mass %, more preferably from 0.15 to 20 mass %, further more preferably from 0.2 to 10 mass %, even more preferably from 0.6 to 5 mass %, even more preferably from 0.6 to 1.4 mass %, even more preferably from 0.6 to 1 mass %, even more preferably from 0.6 to 0.8 mass %.

[13] The cleaning composition for an oral appliance according to any one of [1] to [12], wherein the content of water is preferably 10 mass % or more, more preferably 30 mass % or more, further more preferably 50 mass % or more, further more preferably 70 mass % or more, further more preferably 90 mass % or more, and preferably 99.9 mass % or less, more preferably 99.5 mass % or less, further more preferably 99 mass % or less.

[14] The cleaning composition for an oral appliance according to any one of [1] to [13], wherein pH at 25° C. is preferably 7 or higher, more preferably 8.8 or higher, further more preferably 9 or higher, even more preferably 9.5 or higher, and preferably 14 or lower, more preferably 13 or lower, further more preferably 12 or lower, even more preferably 11 or lower.

[15] A method for cleaning an oral appliance, comprising applying a cleaning composition for an oral appliance to the oral appliance, and leaving them for 3 to 30 minutes, followed by rinsing with water, the cleaning composition comprising the following components (A) and (B):

(A) 0.05 mass % or more and 8 mass % or less of an anionic homopolymer or copolymer which has a mass average molecular weight of 2,000 or higher and 500,000 or lower and comprises a constituent unit derived from (a1) an anionic monomer having a carboxyl group, a sulfo group, or a phosphoric acid group; and (B) one or more surfactants selected from the group consisting of an anionic surfactant, a nonionic surfactant, and an amphoteric surfactant, wherein the mass ratio of the content of the component (A) to the content of the component (B), ((A)/(B)), is 0.05 or more and 50 or less, and the content of (C) a monohydric or dihydric alcohol having 2 or more and 6 or less carbon atoms is less than 8 mass %.

[16] The method for cleaning an oral appliance according to [15], wherein the leaving time is preferably from 4 to 20 minutes, more preferably from 5 to 10 minutes.

[17] A method for using the cleaning composition for an oral appliance according to any one of [1] to [14], wherein the cleaning composition for an oral appliance is applied to an oral appliance, left, and then rinsed off.

[18] The method for using the cleaning composition for an oral appliance according to [17], wherein the time for which the cleaning composition for an oral appliance is applied to the oral appliance is 1 minute or longer and 30 minutes or shorter.

[19] The method for using the cleaning composition for an oral appliance according to [17] or [18], wherein after the cleaning composition for an oral appliance is applied to an oral appliance, the oral appliance is rinsed with water.

[20] Use of the composition according to any one of [1] to [14] as a cleaning composition for an oral appliance.

[21] The use according to [20], wherein the composition is applied to an oral appliance, left, and then rinsed off for use.

[22] The use according to [20] or [21], wherein the time for which the composition is applied to the oral appliance is 1 minute or longer and 30 minutes or shorter.

[13] The use according to any one of [20] to [22], wherein after the composition is applied to an oral appliance, the oral appliance is rinsed with water.

EXAMPLES

Hereinafter, the present invention will be specifically described with reference to Examples. The content of each component in tables is indicated by mass %, unless otherwise specified.

Examples 1 to 20 and Comparative Examples 1 to 3

The components of each example described in Table 1 or 2 were mixed to prepare each cleaning composition for an oral appliance. The obtained cleaning composition for an oral appliance was subjected to each evaluation in accordance with a method described below.

The results are shown in Tables 1 and 2.

The cleaning composition for an oral appliance obtained in Example 1 was filled into a container for foam discharge (a trigger type injection container set to an injection diameter of 5 cm and an injection force of 5 gf in an injection distance of 20 cm), discharged in a foam from a discharge port, applied to used dentures, and left for 5 minutes, followed by rinsing with water to wash off the cleaning composition for an oral appliance. As a result, when the dentures cleaned with the cleaning composition for an oral appliance of the present invention were brought back into the oral cavity, the cleaning composition was able to sufficiently remove the denture plaque of the oral appliance by application for a short time, despite the absence of particular physical additive force such as brushing, and enabled non-slimy, high cleaning performance to be realized.

<<Evaluation of Denture Plaque Removal Effect>>

1) Production of Denture Plaque Model

1)-1 Preparation of Denture Plaque Model Testing Solution

Glycerol stocks of *Streptococcus mutans* JCM5705 and *Candida albicans* JCM1542 were streaked onto an agar plate (Anaero Columbia Agar with RSB, Nippon Becton Dickinson Co., Ltd.), which was then stored, together with a $CO_2$ pack, in a plastic case and cultured at 37° C. for 48 hours to 72 hours under anaerobic conditions. A single colony was picked up from the agar plate thus cultured, placed in a cell culture flask containing 20 ml of dispensed liquid medium A (3 wt % of SCD medium DAIGO (manufactured by Nihon Pharmaceutical Co., Ltd.), 0.5 wt % of Bacto Yeast Extract (manufactured by Becton, Dickinson and Company)), and stirred. Then, this flask was stored, together with a $CO_2$ pack, in a plastic case and cultured at 37° C. for 24 hours under anaerobic conditions.

After the culture, this culture solution was diluted with liquid medium A so as to attain OD=0.5. This diluted solution was diluted with liquid medium B (3 wt % of SCD medium DAIGO, 0.5 wt % of Bacto Yeast Extract, 1 wt % of D(+)-glucose (manufactured by FUJIFILM Wako Pure Chemical Corp.), 2 wt % of sucrose (manufactured by FUJIFILM Wako Pure Chemical Corp.)) so as to attain *S. mutans* OD=0.01 and *C. albicans* OD=0.00001. The diluted solution was further mixed with a sterilized aqueous solution of calcium chloride (manufactured by FUJIFILM Wako Pure Chemical Corp.) such that the final calcium ion concentration was 40 ppm to prepare a denture plaque model testing solution.

1)-2 Production of Denture Plaque Model

A denture substrate (manufactured by Kyoyukai Co., Ltd., material: polymethyl methacrylate resin, 1 cm) was placed in each well of a 24-well plate, and the denture plaque model testing solution prepared in the preceding section 1)-1 was added at 1 mL/well. Then, this plate was stored, together with a $CO_2$ pack, in a plastic case and cultured at 37° C. for 16 hours under anaerobic conditions.

2) Evaluation of Denture Plaque Removal Effect

The denture plaque model testing solution mentioned above in the plate was sucked out using a vacuum pump. Ion exchange water was added at 1 mL/well, and the plate was shaken for 5 minutes. Subsequently, the ion exchange water was sucked out using a pump. The composition obtained in each of Examples and Comparative Examples was prepared at 1 mL/well in another 24-well plate. Subsequently, in the prepared solution, the denture substrate in which the denture plaque model was formed was dipped and applied, and left standing for 5 minutes.

The shaking was performed under conditions of room temperature (25° C.) and 550 rpm using a shaker (BioShake iQ (manufactured by WAKENBTECH Co., Ltd.)).

Then, each composition was sucked out, and ion exchange water was added at 1 mL/well, followed by shaking for 5 minutes. The operation of adding 1 mL of ion exchange water and shaking the plate for 5 minutes was repeated a total of three times. Subsequently, the ion exchange water was sucked out, and a 0.1 mass % crystal violet (CV) solution was added at 750 μL/well, followed by shaking for 15 minutes.

The CV staining solution was further sucked out using a pump, and ion exchange water was added at 1 mL/well, followed by shaking for 5 minutes. The operation of adding 1 mL of ion exchange water and shaking the plate for 5 minutes was repeated twice. Subsequently, the ion exchange water was sucked out using a pump, and ethanol was added at 500 μL/well, followed by pipetting. Then, the extract was diluted 10-fold with ion exchange water, and absorbance $OD_{595\ nm}$ was measured using a microplate recorder (wavelength-variable absorption microplate reader Sunrise Rainbow Thermo manufactured by Tecan Group Ltd.).

Absorbance $OD_{595\ nm}$ (initial value) measured using ion exchange water instead of the obtained composition was used as a reference, and a denture plaque removal rate (%) was calculated according to the equation given below.

A larger value of the obtained denture plaque removal rate means a higher denture plaque removal effect.

$$\text{Denture plaque removal rate (\%)} = 100 - \{OD_{595\ nm} \text{ measured using the obtained composition}/OD_{595\ nm} \text{ measured using ion exchange water instead of the obtained composition}\} \times 100$$

TABLE 1

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| (A) | | Monomer constitution | Mw | | | | | | | | | | |
| | | Acrylic acid/maleic acid copolymer | 2000 | | | | | 1 | | | | | |
| | | Acrylic acid/maleic acid copolymer | 21000 | 1 | 1 | 0.1 | 5 | | 1 | | | | |
| | | Acrylic acid/maleic acid copolymer | 70000 | | | | | | | 1 | | | |
| | | Acrylic acid/sulfonic acid copolymer | 5000 | | | | | | | | 1 | | |
| | | Acrylic acid/sulfonic acid copolymer | 20000 | | | | | | | | | 1 | |
| | | Polyacrylic acid homopolymer | 9000 | | | | | | | | | | 1 |
| (B) | (b1) | Sodium oleate | | 0.5 | | 0.5 | 0.5 | | | | | | |
| | | Sodium laurate | | | 0.5 | | | | | | | | |
| | | Sodium dodecyl sulfate | | | | | | 0.5 | 0.5 | 0.5 | 0.5 | 0.5 | 0.5 |
| | | Sodium α-olefinsulfonate | | | | | | | | | | | |
| | (b2) | Polyoxyethylene alkyl ether | | | | | | | | | | | |
| | (b3) | Cocamidoalkyl betaine | | | | | | | | | | | |
| | | Alkylamine oxide | | | | | | | | | | | |
| (C) | | Propylene glycol (dihydric alcohol having 3 carbon atoms) | | | | | | | | | | | |
| | | 1,3-Butylene glycol (dihydric alcohol having 4 carbon atoms) | | | | | | | | | | | |
| | | Dipropylene glycol (dihydric alcohol having 6 carbon atoms) | | | | | | | | | | | |
| | | Ethanol (monohydric alcohol having 2 carbon atoms) | | | | | | | | | | | |
| (D) | | Sodium carbonate | | 0.44 | 0.44 | 0.44 | 0.44 | 0.13 | 0.13 | 0.88 | 0.13 | 0 88 | 0.13 |
| | | Sodium bicarbonate | | 0.34 | 0.34 | 0.34 | 0.34 | 0.75 | 0.75 | 0.38 | 0.75 | 0 63 | 0.45 |
| | | Citric acid | | | | | | | | | | | |

TABLE 1-continued

| | | | | | | | | | | |
|---|---|---|---|---|---|---|---|---|---|---|
| Ion exchange water | Balance | Balance | Balance | Balance | Balance | Balance | Balance | Balance | Balance | Balance |
| Total | 100 | 100 | 100 | 100 | 100 | 100 | 100 | 100 | 100 | 100 |
| pH (25° C.) | 10.0 | 10.0 | 10.0 | 100 | 9.1 | 9.2 | 9.0 | 9.3 | 9.2 | 92 |
| (A)/(B) mass ratio | 2 | 2 | 0.2 | 10 | 2 | 2 | 2 | 2 | 2 | 2 |
| Denture plaque removal rate [%] | 95 | 51 | 53 | 64 | 45 | 55 | 48 | 42 | 50 | 35 |

| | | | Example | | | | | | | | | | |
|---|---|---|---|---|---|---|---|---|---|---|---|---|---|
| | | | 11 | 12 | 13 | 14 | 15 | 16 | 17 | 18 | 19 | 20 |
| (A) | | Monomer constitution | Mw | | | | | | | | | | |
| | | Acrylic acid/maleic acid copolymer | 2000 | | | | | | | | | | |
| | | Acrylic acid/maleic acid copolymer | 21000 | 1 | 1 | 1 | 1 | 1 | 1 | 1 | 1 | 1 | 1 |
| | | Acrylic acid/maleic acid copolymer | 70000 | | | | | | | | | | |
| | | Acrylic acid/sulfonic acid copolymer | 5000 | | | | | | | | | | |
| | | Acrylic acid/sulfonic acid copolymer | 20000 | | | | | | | | | | |
| | | Polyacrylic acid homopolymer | 9000 | | | | | | | | | | |
| (B) | (b1) | Sodium oleate | | | | | | | | 0.5 | 0.5 | 0.5 | 0.5 |
| | | Sodium laurate | | | | | | | | | | | |
| | | Sodium dodecyl sulfate | | 5 | 5 | | | | | | | | |
| | | Sodium α-olefinsulfonate | | | | 0.5 | | | | | | | |
| | (b2) | Polyoxyethylene alkyl ether | | | | | 0.5 | | | | | | |
| | (b3) | Cocamidoalkyl betaine | | | | | | 0.5 | | | | | |
| | | Alkylamine oxide | | | | | | | 0.5 | | | | |
| (C) | | Propylene glycol (dihydric alcohol having 3 carbon atoms) | | | | | | | | 3 | | | |
| | | 1,3-Butylene glycol (dihydric alcohol having 4 carbon atoms) | | | | | | | | | 3 | | |
| | | Dipropylene glycol (dihydric alcohol having 6 carbon atoms) | | | | | | | | | | 3 | |
| | | Ethanol (monohydric alcohol having 2 carbon atoms) | | | | | | | | | | | 3 |
| (D) | | Sodium carbonate | | 0.13 | | 0.13 | 013 | 0.13 | 0.13 | 0.44 | 0.44 | 0.44 | 0.44 |
| | | Sodium bicarbonate | | 0.75 | 0.60 | 0.75 | 0 75 | 0.75 | 0.75 | 0.34 | 0.34 | 0.34 | 0.34 |
| | | Citric acid | | | 0.10 | | | | | | | | |
| | | Ion exchange water | | Balance | Balance | Balance | Balance | Balance | Balance | Balance | Balance | Balance | Balance |
| | | Total | | 100 | 100 | 100 | 100 | 100 | 100 | 100 | 100 | 100 | 100 |
| | | pH (25° C.) | | 9.1 | 7.4 | 9.1 | 9.2 | 92 | 9.2 | 10.0 | 10.0 | 10.0 | 10.0 |
| | | (A)/(B) mass ratio | | 0.2 | 0.2 | 2 | 2 | 2 | 2 | 2 | 2 | 2 | 2 |
| | | Denture plaque removal rate [%] | | 82 | 39 | 49 | 85 | 50 | 47 | 92 | 87 | 80 | 75 |

TABLE 2

| | | | | Comparative Example | | |
|---|---|---|---|---|---|---|
| | | | | 1 | 2 | 3 |
| (A) | | Monomer constitution | Mw | | | |
| | | Acrylic acid/maleic acid copolymer | 21000 | | 1 | 1 |
| | | Polyacrylic acid homopolymer | 2500000 | 0.1 | | |
| | | Polyethylene glycol | 20000 | | | |
| (B) | (b1) | Sodium oleate | | | | 0.5 |
| | | Sodium dodecyl sulfate | | 0.5 | | |
| (C) | | Ethanol (monohydric alcohol having 2 carbon atoms) | | | | 10 |
| (D) | | Sodium carbonate | | 0.13 | 0.44 | 0.44 |
| | | Sodium bicarbonate | | 0.45 | 0.34 | 0.34 |
| | | Ion exchange water | | Balance | Balance | Balance |
| | | Total | | 100 | 100 | 100 |
| | | pH (25° C.) | | 9.2 | 10.0 | 10.0 |
| | | (A)/(B) mass ratio | | 0 | ∞ | 2 |
| | | Denture plaque removal rate [%] | | 15 | 0 | 11 |

The components shown in Tables 1 and 2 are as follows.

(A) Component and Others

Acrylic acid/maleic acid copolymer; mass average molecular weight=2,000 (manufactured by Kao Corp., POIZ 521), acrylic acid/maleic acid=44/56

Acrylic acid/maleic acid copolymer; mass average molecular weight=21,000 (manufactured by Kao Corp., POIZ 520), acrylic acid/maleic acid=70/30

Acrylic acid/maleic acid copolymer; mass average molecular weight=70,000 (manufactured by BASF SE, Sokalan CP45), acrylic acid/maleic acid=70/30

Acrylic acid/sulfonic acid copolymer; mass average molecular weight=5,000 (manufactured by Nippon Shokubai Co., Ltd., Aqualic GL-386)

Acrylic acid/sulfonic acid copolymer: mass average molecular weight=20,000 (manufactured by Nippon Shokubai Co., Ltd., Aqualic GH-004)

Acrylic acid homopolymer; mass average molecular weight=9,000 (manufactured by Kao Corp., Oligomer D)

Acrylic acid homopolymer; mass average molecular weight=2,500,000 (manufactured by FUJIFILM Wako Pure Chemical Corp., sodium polyacrylate)

Polyethylene glycol (manufactured by FUJIFILM Wako Pure Chemical Corp., polyethylene glycol 20,000)

(B) Component

Sodium oleate (manufactured by Tokyo Chemical Industry Co., Ltd.)

odium laurate (manufactured by Tokyo Chemical Industry Co., Ltd.)

Sodium dodecyl sulfate (manufactured by Sigma-Aldrich Co., LLC)

Sodium α-olefinsulfonate (manufactured by Lion Specialty Chemicals Co., Ltd., LIPOLAN LB-440)

Polyoxyethylene alkyl ether (manufactured by Nippon Shokubai Co., Ltd., SOFTANOL 70)

Cocamidoalkyl betaine (manufactured by Evonik Nutrition & Care GmbH, TEGO BETAIN CK KB 5S)

Alkylamine oxide (manufactured by Kao Corp., Anhitol 20N)

Formulation examples of the cleaning composition for an oral appliance of the present invention will be described below.

The "molecular weight" in the formulation examples means a "mass average molecular weight".

Formulation Example 1

| | |
|---|---|
| Acrylic acid/maleic acid copolymer (molecular weight: 21,000) | 1.0 |
| Potassium oleate | 1.0 |
| Sodium N-cocoyl-L-glutamate | 1.0 |
| Propylene glycol | 5.0 |
| Glycerin | 5.0 |
| Phenoxyethanol | 0.75 |
| Sodium pyrophosphate | 0.2 |
| Sodium carbonate | 0.22 |
| Sodium bicarbonate | 0.17 |
| Sodium sulfite | 0.1 |
| Fragrance | 0.1 |
| Purified water | Balance |
| Total | 100.0% |
| A/B | 0.50 |

Formulation Example 2

| | |
|---|---|
| Acrylic acid/maleic acid copolymer (molecular weight: 70,000) | 1.0 |
| Potassium oleate | 1.0 |
| Sodium N-cocoyl-L-glutamate | 1.0 |
| Propylene glycol | 5.0 |
| Glycerin | 5.0 |
| Phenoxyethanol | 0.75 |
| Sodium pyrophosphate | 0.2 |
| Sodium carbonate | 0.88 |
| Sodium bicarbonate | 0.38 |
| Sodium sulfite | 0.1 |
| Fragrance | 0.1 |
| Purified water | Balance |
| Total | 100.0% |
| A/B | 0.50 |

Formulation Example 3

| | |
|---|---|
| Acrylic acid/sulfonic acid copolymer (molecular weight: 20,000) | 1.0 |
| Potassium oleate | 1.0 |
| Sodium N-cocoyl-L-glutamate | 1.0 |
| Propylene glycol | 5.0 |
| Glycerin | 5.0 |
| Phenoxyethanol | 0.75 |
| Sodium pyrophosphate | 0.2 |
| Sodium carbonate | 0.88 |
| Sodium bicarbonate | 0.63 |
| Sodium sulfite | 0.1 |
| Fragrance | 0.1 |
| Purified water | Balance |
| Total | 100.0% |
| A/B | 0.50 |

Formulation Example 4

| | |
|---|---|
| Acrylic acid/maleic acid copolymer (molecular weight: 21,000) | 5.0 |
| Sodium oleate | 0.5 |
| Sodium N-cocoyl-L-glutamate | 1.0 |
| Propylene glycol | 5.0 |
| Glycerin | 5.0 |
| Phenoxyethanol | 0.75 |
| Sodium pyrophosphate | 0.2 |
| Sodium carbonate | 0.22 |
| Sodium bicarbonate | 0.17 |
| Sodium sulfite | 0.1 |
| Fragrance | 0.1 |
| Purified water | Balance |
| Total | 100.0% |
| A/B | 3.33 |

Formulation Example 5

| | |
|---|---|
| Acrylic acid/maleic acid copolymer (molecular weight: 21,000) | 1.0 |
| Sodium laurate | 1.0 |
| Propylene glycol | 5.0 |
| Glycerin | 5.0 |
| Phenoxyethanol | 0.75 |

-continued

| | |
|---|---|
| Sodium pyrophosphate | 0.2 |
| Sodium carbonate | 0.22 |
| Sodium bicarbonate | 0.17 |
| Fragrance | 0.1 |
| Purified water | Balance |
| Total | 100.0% |
| A/B | 1.00 |

Formulation Example 6

| | |
|---|---|
| Acrylic acid/maleic acid copolymer (molecular weight: 21,000) | 1.0 |
| Sodium lauryl sulfate | 5.0 |
| SOFTANOL 70 | 0.5 |
| Propylene glycol | 5.0 |
| Glycerin | 5.0 |
| Phenoxyethanol | 0.75 |
| Sodium pyrophosphate | 0.2 |
| Sodium carbonate | 0.22 |
| Sodium bicarbonate | 0.17 |
| Fragrance | 0.1 |
| Purified water | Balance |
| Total | 100.0% |
| A/B | 0.18 |

Formulation Example 7

| | |
|---|---|
| Acrylic acid/maleic acid copolymer (molecular weight: 21,000) | 1.0 |
| Sodium α-olefinsulfonate | 1.0 |
| Sodium N-cocoyl-L-glutamate | 1.0 |
| Propylene glycol | 5.0 |
| Glycerin | 5.0 |
| Phenoxyethanol | 0.75 |
| Isopropyl methyl phenol | 0.1 |
| Sodium pyrophosphate | 0.2 |
| Sodium carbonate | 0.13 |
| Sodium bicarbonate | 0.75 |
| Fragrance | 0.1 |
| Purified water | Balance |
| Total | 100.0% |
| A/B | 1.00 |

Formulation Example 8

| | |
|---|---|
| Acrylic acid/maleic acid copolymer (molecular weight: 21,000) | 1.0 |
| Sodium lauryl sulfate | 5.0 |
| Cocamidoalkyl betaine | 0.5 |
| Glycerin | 10.0 |
| Sorbitol | 5.0 |
| Sodium benzoate | 1.0 |
| Phenoxyethanol | 0.75 |
| Disodium edetate | 0.1 |
| Gantrez S-97 BF*[1] (PVM/MA copolymer) | 0.1 |
| Fragrance | 0.1 |
| Purified water | Balance |
| Total | 100.0% |
| A/B | 0.18 |

*[1]manufactured by Ashland Japan Ltd. (Gantrez (R))

Formulation Example 9

| | |
|---|---|
| Acrylic acid/sulfonic acid copolymer (molecular weight: 20,000) | 1.0 |
| Sodium lauryl sulfate | 5.0 |
| Cocamidoalkyl betaine | 0.5 |
| Glycerin | 10.0 |
| Sodium benzoate | 0.5 |
| Ethanol | 5.0 |
| Isopropyl methyl phenol | 0.1 |
| Sodium carbonate | 0.88 |
| Sodium bicarbonate | 0.63 |
| Fragrance | 0.1 |
| Purified water | Balance |
| Total | 100.0% |
| A/B | 0.18 |

Formulation Example 10

| | |
|---|---|
| Acrylic acid/maleic acid copolymer (molecular weight: 21,000) | 1.0 |
| Alkylamine oxide | 0.5 |
| Sodium N-cocoyl-L-glutamate | 1.0 |
| Glycerin | 10.0 |
| Sodium benzoate | 0.5 |
| Phenoxyethanol | 0.75 |
| Sodium carbonate | 0.22 |
| Sodium bicarbonate | 0.17 |
| Fragrance | 0.1 |
| Purified water | Balance |
| Total | 100.0% |
| A/B | 0.67 |

Formulation Example 11

| | |
|---|---|
| Acrylic acid/maleic acid copolymer (molecular weight: 21,000) | 5.0 |
| Potassium oleate | 10.0 |
| Sodium carbonate | 10.0 |
| Sodium bicarbonate | 15.0 |
| Citric acid | 15.0 |
| Polyethylene glycol | 2.0 |
| Sodium percarbonate | 10.0 |
| Tetraacetylethylenediamine | 5.0 |
| Sodium benzoate | 2.0 |
| Protease | 1.0 |
| Fragrance | 0.5 |
| Sodium sulfate | Balance |
| Total | 100.0% |
| A/B | 0.50 |

The components were well mixed, and 3 g thereof was compressed in a tableting machine. One tablet thus obtained was dissolved in 150 mL of water for use.

Formulation Example 12

| | |
|---|---|
| Acrylic acid/maleic acid copolymer (molecular weight: 70,000) | 5.0 |
| Sodium lauryl sulfate | 10.0 |
| Sodium carbonate | 10.0 |
| Sodium bicarbonate | 15.0 |

-continued

| | |
|---|---|
| Citric acid | 15.0 |
| Polyethylene glycol | 2.0 |
| Sodium percarbonate | 10.0 |
| Tetraacetylethylenediamine | 5.0 |
| Sodium benzoate | 2.0 |
| Protease | 1.0 |
| Fragrance | 0.5 |
| Sodium sulfate | Balance |
| Total | 100.0% |
| A/B | 0.50 |

The components were well mixed, and 3 g thereof was compressed in a tableting machine. One tablet thus obtained was dissolved in 150 mL of water for use.

Formulation Example 13

| | |
|---|---|
| Acrylic acid/maleic acid copolymer (molecular weight: 21,000) | 5.0 |
| Sodium lauryl sulfate | 10.0 |
| Sodium carbonate | 14.0 |
| Sodium bicarbonate | 21.0 |
| Citric acid | 21.0 |
| Polyethylene glycol | 2.0 |
| Sodium percarbonate | 10.0 |
| Tetraacetylethylenediamine | 5.0 |
| Sodium benzoate | 2.0 |
| Protease | 1.0 |
| Fragrance | 0.5 |
| Sodium sulfate | Balance |
| Total | 100.0% |
| A/B | 0.50 |

The components were well mixed to form powder. 3 g thereof was dissolved in 150 mL of water for use.

Formulation Example 14

| | |
|---|---|
| Acrylic acid/maleic acid copolymer (molecular weight: 21,000) | 1.0 |
| Potassium oleate | 1.0 |
| Sodium N-cocoyl-L-glutamate | 1.0 |
| Propylene glycol | 5.0 |
| Glycerin | 5.0 |
| Phenoxyethanol | 0.75 |
| Sodium carbonate | 0.22 |
| Sodium bicarbonate | 0.17 |
| Sodium sulfite | 0.10 |
| Fragrance | 0.10 |
| Purified water | Balance |
| Total | 100.0% |
| A/B | 0.50 |

The invention claimed is:

1. A cleaning composition for an oral appliance, comprising the following components (A) and (B):

(A) 0.05 mass % or more and 8 mass % or less of an anionic copolymer which has a mass average molecular weight of 2,000 or higher and 500,000 or lower and comprises a constituent unit derived from (a1) one or more anionic monomers selected from the group consisting of acrylic acid, methacrylic acid, maleic acid, and sulfonic acid; and (B) 0.1 mass % or more and 15 mass % or less of one or more surfactants selected from the group consisting of an anionic surfactant, a nonionic surfactant, and an amphoteric surfactant, wherein a mass ratio of a content of the component (A) to a content of the component (B), ((A)/(B)), is 0.05 or more and 50 or less, and a content of (C), which is a monohydric or dihydric alcohol having 2 or more and 6 or less carbon atoms, is less than 8 mass %.

2. The cleaning composition for an oral appliance according to claim 1, having a pH at 25° C. of 7 or higher and 14 or lower.

3. The cleaning composition for an oral appliance according to claim 1, further comprising (D) a pH adjuster.

4. The cleaning composition for an oral appliance according to claim 3, wherein the content of the component (D) is 0.1 mass % or more and 60 mass % or less.

5. The cleaning composition for an oral appliance according to claim 1, wherein the content of the component (B) is 0.1 mass % or more and 10 mass % or less.

6. A method for cleaning an oral appliance, comprising applying a cleaning composition to the oral appliance, and leaving said cleaning composition in contact with said oral appliance for 3 to 30 minutes, followed by rinsing with water, the cleaning composition comprising the following components (A) and (B):

(A) 0.05 mass % or more and 8 mass % or less of an anionic copolymer which has a mass average molecular weight of 2,000 or higher and 500,000 or lower and comprises a constituent unit derived from (a1) one or more anionic monomers selected from the group consisting of acrylic acid, methacrylic acid, maleic acid, and sulfonic acid; and (B) 0.1 mass % or more and 15 mass % or less of one or more surfactants selected from the group consisting of an anionic surfactant, a nonionic surfactant, and an amphoteric surfactant, wherein a mass ratio of a content of the component (A) to a content of the component (B), ((A)/(B)), is 0.05 or more and 50 or less, and a content of (C), which is a monohydric or dihydric alcohol having 2 or more and 6 or less carbon atoms, is less than 8 mass %.

7. The method according to claim 6, wherein said composition has a pH at 25° C. of 7 or higher and 14 or lower.

8. The method according to claim 6, wherein said composition further comprises (D) a pH adjuster.

9. The method according to claim 6, wherein a content of the component (D) is 0.1 mass % or more and 60 mass % or less.

10. The method according to claim 6, wherein a content of the component (B) is 0.1 mass % or more and 10 mass % or less.

* * * * *